United States Patent
Chevassus et al.

(10) Patent No.: US 9,940,716 B2
(45) Date of Patent: Apr. 10, 2018

(54) METHOD FOR PROCESSING LOCAL INFORMATION

(71) Applicant: AIRBUS GROUP SAS, Paris (FR)

(72) Inventors: Nicolas Chevassus, Chaville (FR); Denis Marraud, Issy les Moulineaux (FR); Antoine Tarault, Paris (FR); Xavier Perrotton, Chatillon (FR)

(73) Assignee: AIRBUS GROUP SAS, Paris (FR)

( * ) Notice: Subject to any disclaimer, the term of this patent is extended or adjusted under 35 U.S.C. 154(b) by 76 days.

(21) Appl. No.: 14/714,273

(22) Filed: May 16, 2015

(65) Prior Publication Data

US 2015/0339819 A1 Nov. 26, 2015

(30) Foreign Application Priority Data

May 21, 2014 (FR) .................................. 14 54556

(51) Int. Cl.
*G06T 7/00* (2017.01)
*G06T 19/00* (2011.01)
*G06F 3/00* (2006.01)
*H04N 5/232* (2006.01)
*G06T 7/80* (2017.01)
(Continued)

(52) U.S. Cl.
CPC ............ *G06T 7/0018* (2013.01); *G06F 3/005* (2013.01); *G06T 7/251* (2017.01); *G06T 7/70* (2017.01); *G06T 7/80* (2017.01); *G06T 19/006* (2013.01); *H04N 5/232* (2013.01);
(Continued)

(58) Field of Classification Search
CPC .................. G06F 3/005; G06T 19/006; G06T 2207/10004; G06T 2207/10016; G06T 2207/30244; G06T 2215/16; G06T 7/0018; G06T 7/004; G06T 7/2046; H04N 5/232

See application file for complete search history.

(56) References Cited

U.S. PATENT DOCUMENTS

2008/0177411 A1 7/2008 Marsh et al.
2015/0235367 A1* 8/2015 Langer .................. G06T 7/0042
348/135

FOREIGN PATENT DOCUMENTS

EP 2201532 A2 6/2010
WO 2011/104167 A1 9/2011

OTHER PUBLICATIONS

Georg Klein and Tom Drummond, "Robust Visual Tracking for Non-Instrumented Augmented Reality", Proceedings of the Second IEEE and ACM International Symposium on Mixed and Augmented Reality (ISMAR '03), 2003.*

(Continued)

*Primary Examiner* — Sing-Wai Wu
(74) *Attorney, Agent, or Firm* — Im IP Law; C. Andrew Im

(57) ABSTRACT

A method for processing local information acquired by a virtual representation and a device having an inertial unit and an image sensor. At least one image of a real environment of the device is captured. The localization of the device in the virtual representation, corresponding to the localization of the device in the real environment, is obtained by correlating the portions of the captured image and portions of the virtual representation, The inertial unit determines the displacement of the device. The localization of the device in the virtual representation is modified as a function of the displacement so that the real position of the device corre- (Continued)

sponds, during the displacement, to the localization of the device in the virtual representation.

8 Claims, 2 Drawing Sheets

(51) Int. Cl.
*G06T 7/70* (2017.01)
*G06T 7/246* (2017.01)

(52) U.S. Cl.
CPC .............. *G06T 2207/10004* (2013.01); *G06T 2207/10016* (2013.01); *G06T 2207/30244* (2013.01); *G06T 2215/16* (2013.01)

(56) References Cited

OTHER PUBLICATIONS

Klein et al., "Tightly integrated sensor fusion for robust visual tracking," Image and Vision Computing, Sep. 1, 2004, pp. 769-776, vol. 22, No. 10, Elsevier B.V.
Reitmayr et al., "Going out: robust model-based tracking for outdoor augmented reality," Mixed and Augmented Reality, 2006, ISMAR 2006, IEEE/ACM International Symposium, Oct. 1, 2006, pp. 109-118, IEEE.
Jiang et al., A robust hybrid tracking system for outdoor augmented reality, Virtual Reality, 2004. Proceedings, Mar. 27, 2004, pp. 3-10, 275, IEEE, Piscataway, NJ, US.
Bleser et al., "Advanced tracking through efficient image processing and visual-inertial sensor fusion," Computers and Graphics, Feb. 1, 2009, pp. 59-72, vol. 33, No. 1, Elsevier, GB.

\* cited by examiner

METHOD FOR PROCESSING LOCAL INFORMATION

RELATED APPLICATIONS

This application claims priority from French Patent Application No. 14 54556 filed May 21, 2014, which is herein incorporated by reference in its entirety.

FIELD OF THE INVENTION

The present invention is aimed at a method for processing local information, a device for implementing such a method and a communicating portable terminal having such a device. The invention can be applied notably in the field of assistance for industrial control. More particularly, the invention can be applied to assembly, maintenance or installation by mixed or augmented reality and to training assistance.

BACKGROUND OF THE INVENTION

Augmented reality in an industrial setting requires a very high level of robustness from localization methods. At present, the estimation of the position of the device used is performed using markers. This technique means that it is possible to have a certain level of robustness only when a marker is visible. Moreover, the located device is localized in the frame of reference of the marker.

Furthermore, there are few devices that allow localization without using a marker. In order to have robust localization of the device, existing methods require a calibration step that is long and not very intuitive. This calibration step does not allow rapid use of the device and requires certain skills for the users.

Moreover, some positioning techniques reconstruct the environment, for example the SLAM (or Simultaneous Localization And Mapping), in real time. Localization in relation to a reconstructed environment is therefore obtained. This has several disadvantages. First of all, it is not possible to detect differences between what has been constructed and what has been drawn. In addition, the reconstructed environment may have element detection errors, for example. Thus, this technique lacks reliability especially in the field of maintenance or when a high level of precision is desired.

The devices that use augmented reality are, most often, devices that allow the display of information superimposed on an image or video.

In the prior art, the European Patent application EP 2201532 is known, which describes a local positioning device configured to determine the relative position of the device in relation to a target object. The device is mounted on a guided and graduated ball joint fixed to a tripod. The ball joint allows the azimuth and the angle of elevation to be determined, which need to be entered manually in order to define the position of the device. This device is therefore difficult to position and to displace in an industrial setting.

OBJECT AND SUMMARY OF THE INVENTION

The present invention is aimed at overcoming all or some of these disadvantages.

To this end, according to a first aspect, the present invention is aimed at a method for processing local information acquired by means of a virtual representation and of a device having an inertial unit and an image sensor, which has the following steps:

capture of at least one image of a real environment of the device, localization of the device in the virtual representation, corresponding to the localization of the device in the real environment, by correlation of portions of a captured image and portions of the virtual representation, determination of the displacement of the device at least by means of the inertial unit, and modification of the localization of the device in the virtual representation as a function of the displacement determined by the inertial unit so that the real position of the device corresponds, during the displacement, to the localization of the device in the virtual representation.

First of all, the invention has the advantage of having localization of the device on the basis of a single captured image. The method therefore has a high level of robustness from the step of localization of the device. Therefore, this step is rapid and does not require any particular skills from the user of the device.

The use of a virtual environment realised a priori allows localization of the device in the point of reference of the virtual representation. Unlike a reconstruction, the representation allows detection of the missing elements on the elements of the real environment. The analysed information has greater reliability. The virtual environment can also be modified as a function of observations made on the real environment.

The correlation step can be performed on the basis of image analysis that does not require a target object. Moreover, the device performing the method of the invention is not fixed and is easy to displace in an industrial setting.

In embodiments, the step of determination of the displacement has the following steps:

estimation of a movement by the inertial unit, estimation of a relative movement between the images captured at one instant and the images captured at a later instant, and combination of the movement estimations.

These embodiments have the advantage of having a position that is as precise as possible. The estimation of the relative movement between two captured images and the estimation of the movement of the inertial unit minimize an estimation error for the position. Actually, industrial environments possibly being visually ambiguous, the determination of the localization by correlation can produce errors between two similar situations. The estimation of the other two movements allows sudden changes of localization to be avoided. The method is therefore more robust.

In embodiments, in the course of the step of localization of the device, the correlation is performed by recognition, in at least one captured image, of predefined discriminating semantic structures in the virtual representation.

This recognition has the advantage of increasing the robustness of the method. The reason is that the more discriminating semantic structures there are in the captured image, the more precise is the method.

In embodiments, the method that is the subject matter of the present invention has a step of decrease of the displacement determined in the course of the step of determination of the displacement.

These embodiments have the advantage of having precise localization in the event of momentary loss of the image or if the image is unusable. The user does not have to wait to stabilize the device in order to know its position in relation to the frame of reference of the virtual representation. The user is therefore more efficient. Thus, this allows a decrease in the micromovements that the device may undergo.

In embodiments, the method that is the subject matter of the present invention, has a step of joint display of a captured image and a portion of the virtual representation corresponding to the displayed captured image.

The advantage of these embodiments is better visualization of the differences between the virtual representation and the real environment. The user is therefore more efficient.

In embodiments, the method that is the subject matter of the present invention has a step of editing of localized information on the virtual representation.

The advantage of these embodiments is that of having precisely localized information. Moreover, since the information is recorded on the virtual representation, it is easily transferred and accessible. The information recorded for previous uses of the device is accessible and modifiable.

According to a second aspect, the present invention is aimed at a device for processing local information that has:
an image sensor, which provides at least one image of the real environment of the device,
a means for accessing a virtual representation, which additionally has:
a means for localizing the device in the virtual representation, corresponding to the localization of the device in the real environment, by correlation of portions of a captured image and portions of the virtual representation,
an inertial unit that determines a displacement of the device, and
a means for modifying the localization of the device in the virtual representation as a function of the displacement determined by the inertial unit so that the real position of the device corresponds, during the displacement, to the localization of the device in the virtual representation.

Since the advantages, aims and particular features of the device that is the subject matter of the present invention are similar to those of the method that is the subject matter of the present invention, they are not recalled at this juncture.

In embodiments, the device that is the subject matter of the present invention has a display means configured to jointly display a captured image and a portion of the virtual representation corresponding to the displayed captured image.

These embodiments have the advantage of comparing the real environment with the virtual representation in order to detect anomalies.

In embodiments, the device that is the subject matter of the present invention has a means for editing localized information on the virtual representation.

The advantage of these embodiments is the possibility of creating and modifying precisely localized annotations directly on the virtual representation.

According to a third aspect, the present invention is aimed at a communicating portable terminal having a device that is the subject matter of the present invention.

These provisions make the invention compact and easily transportable in industrial settings, which are often difficult to access.

BRIEF DESCRIPTION OF THE FIGURES

Other advantages, aims and features of the invention will emerge from the nonlimiting description that follows for at least one particular embodiment of the method and the device for processing local information, and for the communicating portable terminal having such a device, with reference to the appended drawings, in which.

DESCRIPTION OF EXEMPLARY
EMBODIMENTS OF THE INVENTION

It should be noted, from the outset, that the figures are not to scale.

Figure 1:
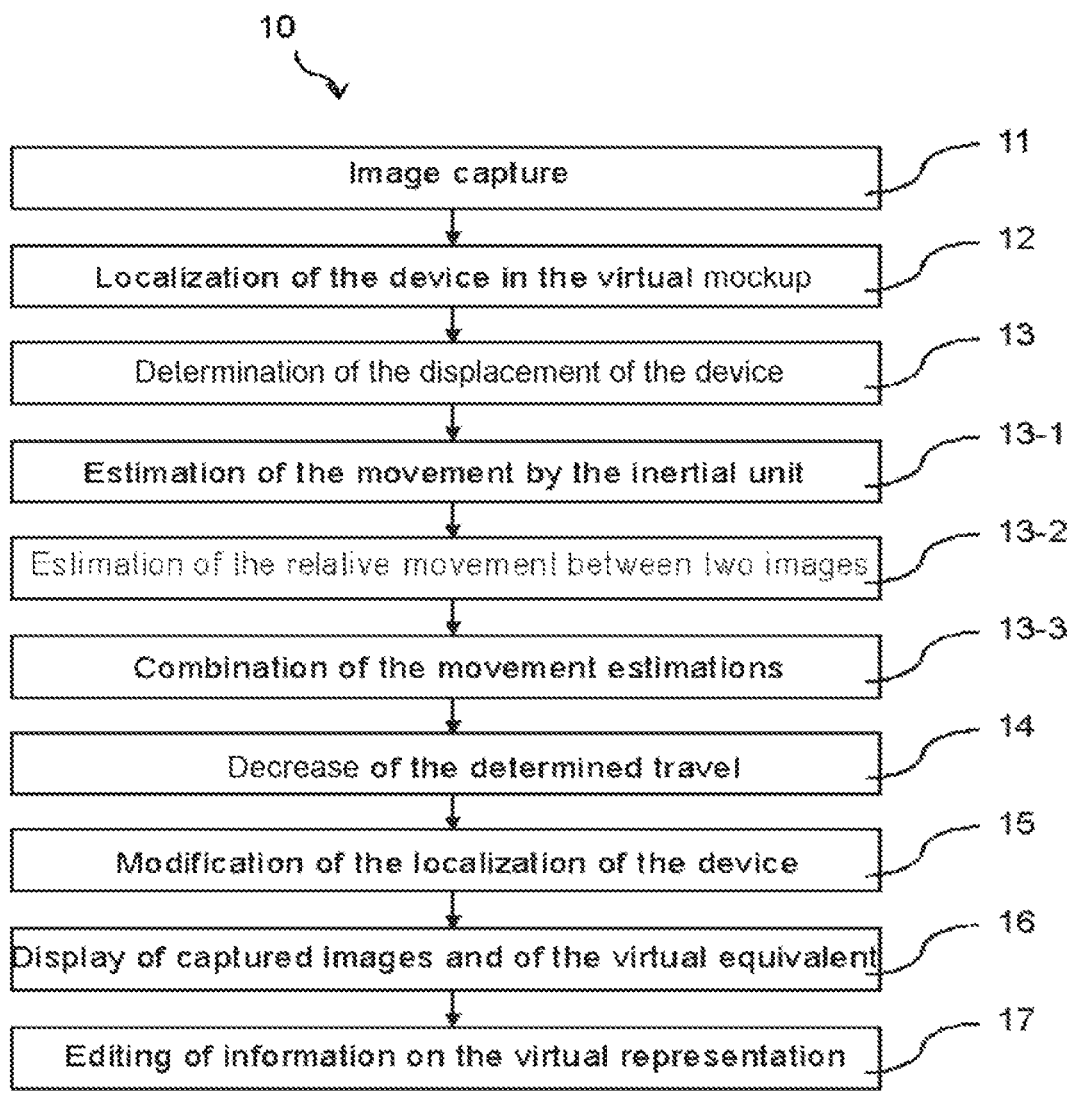
FIG. 1 shows, in the form of a flow chart, an embodiment of the method that is the subject matter of the present invention.

FIG. 1 reveals a particular embodiment of the method 10, which is the subject matter of the present invention, that has:
a step 11 of capture of images that are representative of the real environment,
a step 12 of localization of a device in a virtual mockup corresponding to the localization of the device in the real environment,
a step 13 of determination of the displacement of the device having three substeps:
  a step 13-1 of estimation of the movement by the inertial unit,
  a step 13-2 of estimation of the relative movement between the images captured at one instant and the images captured at a later instant,
  a step 13-3 of combination of the movement estimations determined in steps 13-1 and 13-2 determining a displacement of the device,
a step 14 of decrease of the determined displacement,
a step 15 of modification of the position of the device in the virtual representation as a function of the determined displacement,
a step 16 of joint display of captured images and a portion of the virtual representation corresponding to the displayed captured image, and
a step 17 of editing of localized information on the virtual representation.

Step 11 is performed by means of an image capture device. The image capture device is a camera, a photographic apparatus or a scanner, for example. In the remainder of the description, "camera" denotes an image capture device. The camera may be of monocular, stereoscopic, RGB-D or plenoptic type. The camera effecting the image capture in step 11 can be used in two modes:
video mode, allowing continuous shooting, and
still image mode, configured for more in-depth analysis of certain shots, for example when shooting is difficult.

The video mode can include a substep of processing of the quality of an image by means of stabilization, denoising and super-resolution. This step is used for detailed local views, for example.

The still image mode is distinguished from the video mode by the absence of time constraints. The image may be of better quality and it is possible to implement a global localization strategy by optimizing the localization of all of the images. By way of example, this may involve taking account of knowledge of certain features of the shooting, such as panoramic features.

Step 12 is a calibration step. When it is created, discriminating semantic structures are denoted in the virtual representation. The virtual representation may be a digital mockup, also called a DMU. The digital mockup is preferably realised by means of computer-aided design (CAD) software. The virtual representation may include: assembly or inspection information, tests and measurements, annotations, elements to be controlled, nonconformities. The information may be of different types:
text such as metadata associated with the objects in the scene, for example,
image,
geometry,
video or
3D scan, which can be acquired from the objects in the scene during prior use.

Preferably, the virtual representation is a simplification of the raw digital mockup, produced when the represented object was designed. The raw digital mockup is filtered and organized so as to:
select the objects that are relevant to the task to be performed,
extract metadata for display or editing,
organize data for simplifying the geometries and
define discriminating semantic structures by means of a method for automatic analysis of the geometric structures that are present in the digital mockup.

Preferably, these discriminating semantic structures:
minimize the natural ambiguity of the scene,
maximize their probability of detection,
possibly take account of the reference structures.

The discriminating semantic structures take account of reference structures when tolerance constraints so require. In this case, the discriminating semantic structures are selected exclusively from the reference elements.

The discriminating semantic structures are preferably geometric structures of point, line, circle, ellipse, surface, parameterized volume, texture-rich element or contour type.

The discriminating semantic structures may be:
visual, multimodal and nonambiguous seamarks,
easily detectable calibration sights.

The term multimodal means that they correspond to primitives extracted from the various available images, whatever the nature thereof. Nonambiguity is defined as corresponding to single configurations or descriptions in a close neighbourhood.

Visual seamarks allow calibration without the intervention of a user. Calibration sights require the intervention of a user, only used to localize the sight approximately in the virtual representation. The sight can be positioned on a surface in order to define a normal to the surface. The user can reproduce the normality and the positioning rapidly in the virtual representation.

Moreover, later addition of automatically localized sights on the digital representation allows further increase in the robustness of the method and in the precision of the position of the device in the digital representation. The localization is automatic when the new positioned sight is captured by the camera in an image having at least one semantic structure that is already referenced.

Following localization of the first sight, a correlation between the discriminating semantic systems of the captured images and those of the virtual representation is performed.

Preferably, the correlation is performed on the basis of the contours extracted from the virtual representation, which are then aligned with the contours extracted from the image. This allows a reduction in drift during use in video mode.

Initialization of step 12 can be totally automated if the number of visual seamarks is sufficient for it not to be necessary to place a sight. Moreover, the selection of the seamarks or sights to be extracted can be made on the basis of various criteria: the proximity of an object of interest that is marked in the virtual representation or the dimension of the seamarks or the sights, for example.

In localization step 12 the initial position of the inertial unit is defined.

Step 13 of determination of the displacement can be performed in three substeps, 13-1, 13-2 and 13-3.

Step 13-1 of estimation of the movement by the inertial unit is a step of computation of the displacement between the initial position of the inertial unit defined in step 12 and the estimated position of the inertial unit following displacement of the device.

Step 13-2 of estimation of the relative movement between the images captured at one instant and the images captured at a later instant is an image processing step. More particularly, a recognition of the semantic structures is effected in the two images. By comparing the positions of these structures in the image, it is possible to determine an estimation of the movement of the device.

Step 13-2 can be iterative and makes use of the capabilities of the virtual representation, for example a depiction of texture, a map of depths, a map of normals. Preferably, the step is matching of the 3D primitives extracted from the previously cited depictions to 2D or 3D primitives extracted from the image acquired by the camera. The selection of the visible 3D primitives is managed intrinsically and a step of model preparation is avoided.

Step 13-3 of combination of the movement estimations determined in steps 13-1 and 13-2 determines a displacement of the device. Preferably, an estimation of the position using the correlation from step 12 is combined with the movement estimations in order to determine the position of the device at a later instant.

A level of trust can be attributed to each estimation. The displacement is preferably determined by weighting the estimations with the corresponding levels of trust. The method is therefore more robust and precise. By way of example, when the image is fuzzy, the level of trust attributed to the estimation of the position by correlation is low.

Step 13-3 is configured to:
limit the calibration effort by reducing the number of reference seamarks, and therefore the number of primitives defined in step 13-2,
increase the robustness of reattachment in the event of a momentary loss of visual calibration, for example if the camera is masked.

Step 14 of decrease of the displacement determined in step 13-3 is configured to decrease the impression of floating between the virtual representation and the captured images. Step 14 may be filtering of the rotation and translation data from the inertial unit. By way of example, the estimation of the movement by the inertial unit is filtered in order to minimize the impact of vibrations or small movements caused by the user. Depending on the mode of selection of the semantic structures, the small movements can be decreased while preserving alignment with the points of interest in the image.

Step 15 of modification of the position of the device in the virtual representation as a function of the determined displacement is configured to update precisely the position of the device as a function of the displacement determined in step 13-3 and decreased in step 14.

Step 16, of joint display of captured images and a portion of the virtual representation corresponding to the displayed captured image, uses the position and orientation of the device, which are modified in step 15 and localized in the frame of reference of the virtual representation, in order to define the portion of the virtual representation that is to be displayed. The joint display may be a display:

in juxtaposition, in which the images are placed beside one another, so as to allow a comparison, for example, or in superposition, in which the virtual representation is transparent, so as to have the display of the information that is added to the raw digital mockup and linked to the industrial process.

The display may be:

as a global view, which is a wide-field view in order to have a global vision of the scene to be analysed, as a local view, which is a detailed view or a zoom of a portion of a global view, the local view being indicated in a global view.

Step 17 of editing of localized information on the virtual representation is performed on the basis of the information display provided in step 16. Precisely localised information can be automatically or manually associated with the virtual representation. By way of example, this information is provided by:

the operator, such as an indication of nonconformity in the real environment, the camera, such as a photograph, a video or a 3D scan, an external device allowing a measurement of pressure, temperature or lighting level, for example.

This information is recorded in the virtual representation and can be used for later use. This information can be edited in order to take account of a change in a local situation, for example, such as the correction of a nonconformity.

The editing step may also be a check by the user on the local alignment. This check is preferably performed by means of the superposition display defined previously. Preferably, the position of the virtual representation is transparent and the alignment is performed on the basis of a still image. The operator can displace an isolated position in 3D without casting doubt on the global alignment. The user can precisely align the real with the virtual by virtue of a zoom centred on the point that is to be aligned.

The method 10 is performed by means of a device 20.

Figure 2:
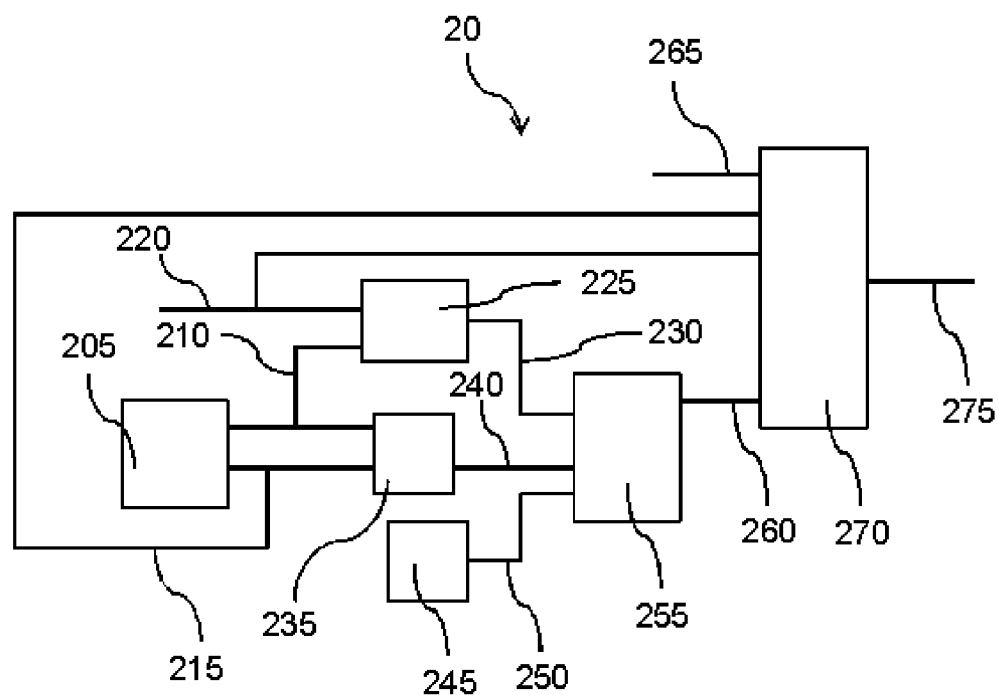
FIG. 2 shows, schematically, an embodiment of the device that is the subject matter of the present invention.

FIG. 2 reveals a particular embodiment of the device 20 that is the subject matter of the present invention.

A camera 205 captures an image 210 and an image 215 that is later than the image 210. The images 210 and 215 represent a real environment. The image 210 is transmitted to a device 225. The device 225 also takes account of a virtual representation 220 of the real environment. The device 225 extracts discriminating semantic structures from the virtual representation and from the captured image and performs a correlation that is configured to obtain localization 230 of the device in the frame of reference of the digital representation according to step 12 of the method 10. The device 225 is a microprocessor, for example.

The image 210 is also transmitted with the image 215 to a device 235. The device 235 extracts the discriminating semantic structures for the two images and compares them in order to deduce therefrom an estimation of the movement that the device 20 has made between the instant at which the image 210 was captured and the later instant at which the image 215 was captured. By way of example, the device 235 is a microprocessor that performs the estimation according to step 13-2 of the method 10. The information 240 is the estimation of the movement of the device 20 at the output of the device 235.

An inertial unit 245 is initialized when the image 210 is captured. The inertial unit provides a device 255 with a piece of movement estimation information 250 in accordance with step 13-1 of the method 10.

The device 255 may be a microprocessor. The device 255 takes account of the initial localization information 230 from the device 20 and, as a function of the movement estimations 240 and 250, transmits a signal 260 corresponding to the new position of the device 20 in the virtual representation. The device 255 performs steps 13-3, 14 and 15 of the method 10.

A device 270 is a display device. The device 270 jointly displays the image 215 and the virtual representation 220 at the position 260 corresponding to the image 215. The device 270 can also take account of a piece of information 265 that needs to be edited on the virtual representation. The information 275 at the output of the device 270 is the edited virtual representation.

Figure 3:
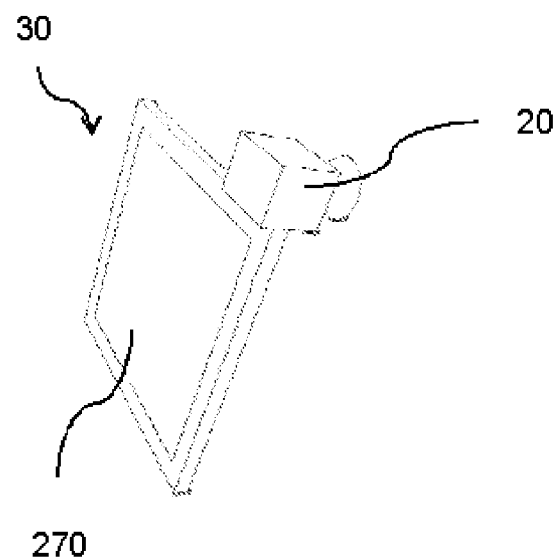
FIG. 3 shows, schematically, an embodiment of the communicating portable terminal that is the subject matter of the present invention.

FIG. 3 reveals a particular embodiment of the communicating portable terminal 30 that is the subject matter of the present invention.

The communicating portable terminal 30 has a display screen 270 connected to the remainder of the device 20. The communicating portable terminal 30 is preferably:

a digital tablet, a device of "smartphone" type, spectacles, a helmet or a computer.

The invention claimed is:

1. A method for processing local information acquired by a virtual representation and a device comprising an inertial unit and an image sensor, comprising the steps of:

capturing at least one image of a real environment of the device;

localizing the device by correlating portions of said at least one captured image and portions of the virtual representation to obtain localization of the device in the virtual representation, corresponding to the localization of the device in the real environment, by automatic recognition, in said at least one captured image, of visual, multimodal and non-ambiguous seamarks that are predefined in the virtual representation, wherein the localization initializes the device that is uninitialized;

determining a displacement of the device at least by the inertial unit;

modifying the localization of the device in the virtual representation as a function of the displacement determined by the inertial unit so that a real position of the device corresponds, during the displacement, to the localization of the device in the virtual representation;

jointly displaying said at least one captured image and a portion of the virtual representation corresponding to the displayed captured image; and modifying the virtual representation by editing localized information related to the real environment, such as an indication of nonconformity, a measurement of pressure, temperature or lighting level, on the virtual representation.

2. The method for processing local information according to claim 1, wherein the step of determining the displacement comprises the steps of:

estimating a movement by the inertial unit;

estimating a relative movement between images captured at one instant and images captured at a later instant; and combining the movement estimation and the relative movement estimation.

3. The method for processing local information according to claim 1, further comprising the step of decreasing the displacement determined by the inertial unit.

4. The method for processing local information according to claim 1, wherein the displaying step is a superposition in which the virtual representation is transparent.

5. The method for processing local information according to claim 1, further comprising a step of recording the localized information in the virtual representation in order to take account of a change in a local situation, such as a nonconformity.

6. A device for processing local information, comprising:
an image sensor configured to provide at least one image of a real environment of the device;
a microprocessor to access a virtual representation;
a localization processor to initialize the device that is uninitialized and to localize the device in the virtual representation, corresponding to the localization of the device in the real environment, by correlating portions of said at least one captured image and portions of the virtual representation, the processor performs correlation by automatic recognition, in said at least one captured image, of visual, multimodal and non-ambiguous seamarks that are predefined in the virtual representation;
an inertial unit to determine a displacement of the device;
a modifying processor to modify the localization of the device in the virtual representation as a function of the displacement determined by the inertial unit so that a real position of the device corresponds, during the displacement, to the localization of the device in the virtual representation;
a display device configured to jointly display a captured image and a portion of the virtual representation corresponding to the displayed captured image;
a display screen to modify the virtual representation by editing localized information related to the real environment, such as an indication of nonconformity, a measurement of pressure, temperature or lighting level, on the virtual representation.

7. A communicating portable terminal comprising the device for processing local information according to claim 6.

8. The device for processing local information according to claim 6, wherein the display device is configured to record the localized information in the virtual representation in order to take account of a change in a local situation, such as a nonconformity.

* * * * *